(12) United States Patent
Chen et al.

(10) Patent No.: US 11,250,249 B2
(45) Date of Patent: Feb. 15, 2022

(54) HUMAN BODY GENDER AUTOMATIC RECOGNITION METHOD AND APPARATUS

(71) Applicants: CHINA COMMUNICATION TECHNOLOGY CO., LTD., Shenzhen (CN); SHENZHEN VICTOOTH TERAHERTZ TECHNOLOGY CO., LTD., Shenzhen (CN)

(72) Inventors: Hanjiang Chen, Shenzhen (CN); Yanli Liu, Shenzhen (CN); Chunchao Qi, Shenzhen (CN); Guangsheng Wu, Shenzhen (CN); Shukai Zhao, Shenzhen (CN); Qing Ding, Shenzhen (CN)

(73) Assignees: CHINA COMMUNICATION TECHNOLOGY CO., LTD., Shenzhen (CN); SHENZHEN VICTOOTH TERAHERTZ TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/321,807

(22) PCT Filed: Jul. 17, 2017

(86) PCT No.: PCT/CN2017/093238
§ 371 (c)(1),
(2) Date: Jan. 29, 2019

(87) PCT Pub. No.: WO2018/019149
PCT Pub. Date: Feb. 1, 2018

(65) Prior Publication Data
US 2020/0042779 A1 Feb. 6, 2020

(30) Foreign Application Priority Data
Jul. 29, 2016 (CN) .......................... 201610619371.7

(51) Int. Cl.
*G06K 9/00* (2006.01)
*G06T 7/11* (2017.01)
(Continued)

(52) U.S. Cl.
CPC ....... *G06K 9/00362* (2013.01); *G06K 9/4614* (2013.01); *G06K 9/6267* (2013.01); *G06T 7/11* (2017.01); *G06T 2207/30196* (2013.01)

(58) Field of Classification Search
CPC ............ G06T 7/11; G06T 2207/30196; G06K 9/00362; G06K 9/4614; G06K 9/6267
(Continued)

(56) References Cited

U.S. PATENT DOCUMENTS

2013/0121529 A1* 5/2013 Fleisher ................... G06K 9/78
382/103

FOREIGN PATENT DOCUMENTS

| CN | 102540264 | 7/2012 |
|---|---|---|
| CN | 102708560 | 10/2012 |

(Continued)

OTHER PUBLICATIONS

Nguyen, et al. (Body-Based Gender Recognition Using Images from Visible and Thermal Cameras), pp. 1-21 (Year: 2016).*
(Continued)

*Primary Examiner* — Daniel G Mariam
(74) *Attorney, Agent, or Firm* — Jason P. Mueller; FisherBroyles, LLP

(57) ABSTRACT

A human body gender automatic recognition method includes: acquiring a current millimeter wave grayscale image, and determining gender part region positions of a human body in the millimeter wave grayscale image according to a pre-set body proportion; extracting a region sub-image corresponding to the gender part region position; performing dimension normalization on the region sub-
(Continued)

image to obtain a normalized region sub-image; performing feature information extraction on the normalized region sub-image to obtain feature information about the normalized region sub-image; recognizing the millimeter wave grayscale image by means of each pre-set classifier, and respectively outputting results; and integrating the output results to obtain a classification recognition result of the millimeter wave grayscale image. The method has relatively high recognition rate and calculation efficiency and solves the problem of a privacy protection and detection method in a millimeter wave security inspection system.

18 Claims, 4 Drawing Sheets

(51) Int. Cl.
  *G06K 9/46* (2006.01)
  *G06K 9/62* (2006.01)

(58) Field of Classification Search
  USPC .................................. 382/103, 159, 190, 224
  See application file for complete search history.

(56) References Cited

FOREIGN PATENT DOCUMENTS

| | | |
|---|---|---|
| CN | 103198303 | 7/2013 |
| CN | 106326834 | 1/2017 |
| WO | 2012/119216 A * | 9/2012 |

OTHER PUBLICATIONS

Computer English Translation of Chinese Patent Nos. CN 102708560 A.. (Year: 2012).*
Computer English Translation of Chinese Patent Nos. CN 102540264-A.. (Year: 2012).*

* cited by examiner

HUMAN BODY GENDER AUTOMATIC RECOGNITION METHOD AND APPARATUS

PRIORITY INFORMATION

This Application is a National Stage Entry under 35 U.S.C. 371 of PCT Patent Application No. PCT/CN2017/093238, filed Jul. 17, 2017, which claims priority to Chinese Patent Application No. 201610619371.7, filed Jul. 29, 2016, the entire contents of each of which are incorporated herein by reference.

TECHNICAL FIELD

This disclosure relates to the technical fields of image processing and security inspection, in particular to a human body gender automatic recognition method and apparatus.

DESCRIPTION OF RELATED ART

Millimeter waves have certain penetrability during propagation. By means of the millimeter wave imaging technology, a scanned human body covered by clothing can be imaged, so as to obtain an object imaging result. Therefore, the gender of a detected person can be recognized based on the millimeter wave imaging result. If suspicious dangerous objects are directly detected by the naked eyes of security personnel, the consumption of manpower, financial resources and time is huge. However, the traditional gender recognition methods, on the one hand, are mainly aimed at visible image data; on the other hand, in the human body gender recognition method according to millimeter wave image, single feature information (such as gray variance information) is often used for classification recognition.

During implementation, the inventors found that there are at least the following problems in the conventional technology:

(1) there is an essential difference between a millimeter wave imaging mechanism and a visible light imaging mechanism, a millimeter wave image has low gray level, low definition and is affected by speckle multiplicative noise, a pattern recognition method for a visible light image cannot be directly applied in a millimeter wave image, and calculation efficiency is low; and (2) millimeter wave images of different genders have many forms of feature representation, gray variance information is only one of many possible kinds of feature information for distinguishing between different genders, therefore, a detection method based on a single feature cannot meet the requirement for automatic gender recognition in a millimeter wave security inspection system, because it tends to cause low recognition accuracy.

SUMMARY

Based on this, it is necessary to provide a human body gender automatic recognition method and apparatus to solve the problem of low calculation efficiency and recognition accuracy of the traditional gender recognition methods.

In order to achieve the above object, an embodiment includes:

On the one hand, a human body gender automatic recognition method is provided and comprises the following stages:

acquiring a current millimeter wave grayscale image to be recognized, and determining gender part region positions of a human body in the millimeter wave grayscale image according to a pre-set body proportion, wherein the gender part region positions include a chest region position and a crotch region position;

extracting a region sub-image corresponding to the gender part region position;

performing dimension normalization on the region sub-image to obtain a normalized region sub-image;

performing feature information extraction on the normalized region sub-image to obtain feature information about the normalized region sub-image, wherein the feature information includes shape feature information and chest region feature information of the chest region position, and gray variance information and crotch region feature information of the crotch region position;

recognizing the millimeter wave grayscale image by means of each pre-set classifier corresponding to the feature information according to the size order of feature distances, and respectively outputting results, wherein the feature distance is the distance between the feature information and the feature information of the corresponding pre-set classifier; and integrating the output results to obtain a classification recognition result of the millimeter wave grayscale image.

On the other hand, a human body gender automatic recognition apparatus is provided and comprises:

a region position determination unit, used for acquiring a current millimeter wave grayscale image to be recognized, and determining gender part region positions of a human body in the millimeter wave grayscale image according to a pre-set body proportion, wherein the gender part region positions include a chest region position and a crotch region position;

a sub-image extraction unit, used for extracting a region sub-image corresponding to the gender part region position;

a normalization processing unit, used for performing dimension normalization on the region sub-image to obtain a normalized region sub-image;

a feature information extraction unit, used for performing feature information extraction on the normalized region sub-image to obtain feature information about the normalized region sub-image, wherein the feature information includes shape feature information and chest region feature information of the chest region position, and gray variance information and crotch region feature information of the crotch region position;

a classification unit, used for recognizing the millimeter wave grayscale image by means of each pre-set classifier corresponding to the feature information according to the size order of feature distances, and respectively outputting results, wherein the feature distance is the distance between the feature information and the feature information of the corresponding pre-set classifier; and a recognition unit, used for integrating the output results to obtain a classification recognition result of the millimeter wave grayscale image.

The technical scheme has the following beneficial effect:

according to the human body gender automatic recognition method and apparatus, in order to achieve high recognition accuracy during automatic recognition of the gender of a human body in a millimeter wave image, content information of the millimeter wave image is analyzed according to the different characteristics of the imaging results of the millimeter wave images of human bodies of different genders, and gender recognition is achieved by extracting different kinds of feature information and integrating multiple classifiers, so that human body gender automatic recognition is realized by means of the millimeter wave image. Disclosed embodiments may be effectively applied to a real millimeter wave security inspection system, has high recognition rate and calculation efficiency, and solves the problem of adopting different privacy protection and detection methods for human bodies of different genders in the millimeter wave security inspection system.

DETAILED DESCRIPTION

In order to facilitate the understanding of the present disclosure, the present disclosure will be described more fully below with reference to the relevant drawings. Embodiments of the present disclosure are shown in the accompanying drawings. However, the present disclosure may be implemented in many different forms and is not limited to the embodiments described herein. On the contrary, the purpose of providing these embodiments is to make the disclosure of the present disclosure more thorough and complete.

Unless otherwise defined, all technical and scientific terms used herein have the same meaning as commonly understood by those skilled in the technical field of the present disclosure. The terms used herein in the description of the present disclosure are for the purpose of describing specific embodiments only and are not intended to limit the present disclosure. As used herein, the term "and/or" includes any and all combinations of one or more related listed items.

Figure 1:
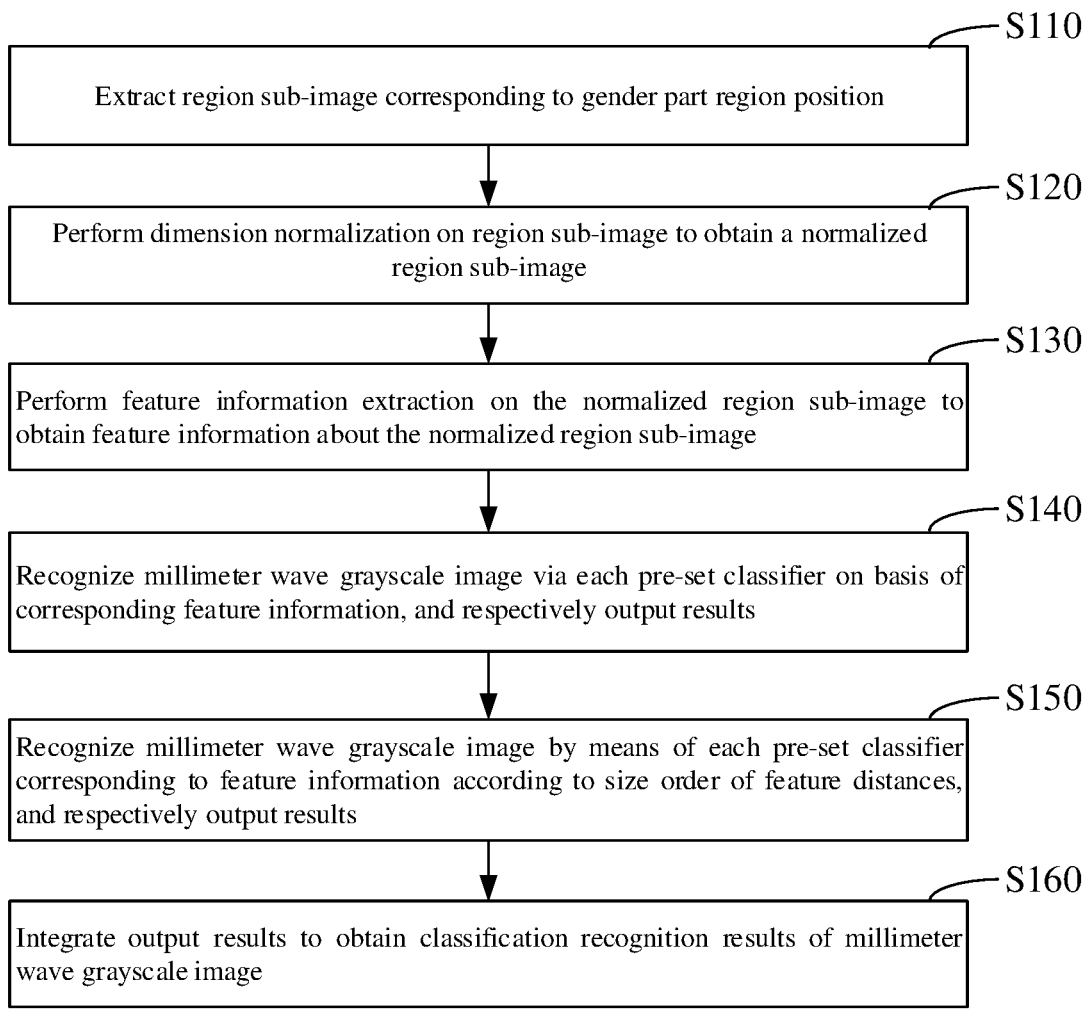
FIG. 1 is a flowchart an embodiment of a human body gender automatic recognition method.

Embodiment 1 of Human Body Gender Automatic Recognition Method of the Present Disclosure In order to solve the problem of low calculation efficiency and recognition accuracy of the traditional gender recognition methods, the disclosure provides embodiment 1 of a human body gender automatic recognition method. FIG. 1 is a flowchart of embodiment 1 of the human body gender automatic recognition method of the present disclosure. As shown in FIG. 1, the following stages may be included:

S110: acquiring a current millimeter wave grayscale image to be recognized, and determining gender part region positions of a human body in the millimeter wave grayscale image according to a pre-set body proportion, wherein the gender part region positions include a chest region position and a crotch region position;

S120: extracting a region sub-image corresponding to the gender part region position;

S130: performing dimension normalization on the region sub-image to obtain a normalized region sub-image;

S140: performing feature information extraction on the normalized region sub-image to obtain feature information about the normalized region sub-image, wherein the feature information includes shape feature information and chest region feature information of the chest region position, and gray variance information and crotch region feature information of the crotch region position;

S150: recognizing the millimeter wave grayscale image by means of each pre-set classifier corresponding to the feature information according to the size order of feature distances, and respectively outputting results, wherein the feature distance is the distance between the feature information and the feature information of the corresponding pre-set classifier; and S160: integrating the output results to obtain a classification recognition result of the millimeter wave grayscale image.

Specifically, through a large number of experiments, the inventors of the present disclosure have found that in millimeter wave images of human bodies of different genders, for the chest region sub-images, the chest sub-image of a female shows an obvious shape feature, while the chest sub-image of a male shows a relatively gentle grayscale; for the crotch region sub-images, the crotch sub-image of a male shows a larger gray variance, while the crotch sub-image of a female shows a smoother grayscale; and in the chest and crotch region sub-images, the grayscale information of males is different from that of females in different small regions.

In order to improve the accuracy of human body gender recognition, the disclosure determines the positions of the chest and crotch regions of the human body according to the body proportion for the input millimeter wave image; then extracts the chest region sub-image and crotch region sub-image and performs dimension normalization; extracts the shape feature information and haar-like feature information of the normalized chest sub-image and the haar-like feature information and gray variance information of the normalized crotch sub-image; extracts the shape feature information of the chest region sub-image and trains a classifier; extracts the gray variance information of the crotch region sub-image and trains a classifier; extracts the haar-like feature information of the chest region sub-image and the haar-like feature information of the crotch region sub-image and trains a classifier; and finally, integrates the three classifiers for judgment, so as to complete the automatic recognition of human gender in the millimeter wave image of human body.

In a specific embodiment, S110 may comprise:

according to the segmentation threshold T, the binary image $I_b$ of the millimeter wave grayscale image is obtained based on the following formula:

$$I_b(x, y) = \begin{cases} 255 & I(x, y) \geq T \\ 0 & I(x, y) < T \end{cases}, 1 \leq x \leq X, 1 \leq y \leq Y$$

X is the number of rows of the millimeter wave grayscale image; and Y is the number of columns of the millimeter wave grayscale image;

based on the following formula, the spatial distribution histogram vector $H_y$ is constructed for the human body region segmented in $I_b$ (x,y) in the y direction:

$$H_y(y) = \sum_x \delta(I_b(x, y) = 255)$$

wherein $\delta$ represents the Dirac $\delta$ function; x represents row coordinates; and y represents column coordinates;

the histogram vector $H_y$ is smoothed based on the following formula:

$$H_y(y) = \begin{cases} H_y(y) & y < 2 \\ (H_y(y-1) + H_y(y) + H_y(y+1))/3 & 2 \le y \le Y-1 \\ H_y(y) & y > Y-1 \end{cases}$$

the column where the vertical median line of the human body is located is obtained through iterative operation of the histogram vector $H_y$ in the y direction;

the left and right pixels of the column where the median line of the binary image $I_b$ is located are counted with the middle row of the column where the vertical median line of the human body is located as the benchmark, so as to obtain the row $x_t$ where the head of the human body is located and the row $x_f$ where the foot of the human body is located;

according to the row $x_t$ where the head of the human body is located and the row $x_f$ where the foot of the human body is located, the height $H_e = x_f - x_t$ of the human body is determined;

according to the preset body proportion, the chest starting row $x_{ch} = x_f - H_e * R_{ch}$ and the crotch starting row $x_{cr} = x_f - H_e * R_{cr}$ are calculated based on the following formula, wherein $R_{ch}$ is the ratio of chest to body height in a statistical sense and $R_{cr}$ is the ratio of crotch to body height in a statistical sense.

In a specific embodiment, the stage of obtaining the column where the vertical median line of the human body is located through the iterative operation of the histogram vector $H_y$ in the y direction may comprise:

based on the following formula, the initial center point position value $y_t^{(0)}$ is set in the y-direction spatial distribution histogram vector $H_y$:

$$y_t^{(0)} = (\min(y) + \max(y))/2;$$

based on the following formula, the spatial distribution mean values $\mu_{y1}^{(n)}$ and $\mu_{y2}^{(n)}$ of the set $Y_1$ whose spatial distribution position is lower than $y_t^{(n-1)}$ and the set $Y_2$ whose spatial distribution position is higher than $y_t^{(n-1)}$ are calculated respectively:

$$\mu_{Y_1}^{(n)} = \frac{\sum_{y < y_t^{(n-1)}} y H_y(y)}{\sum_{y < y_t^{(n-1)}} H_y(y)}, \mu_{Y_2}^{(n)} = \frac{\sum_{y < y_t^{(n-1)}} y H_y(y)}{\sum_{y < y_t^{(n-1)}} H_y(y)};$$

based on $y_t^{(n)} = (\mu_{Y_1}^{(n)} - \mu_{Y_2}^{(n)})/2$, iteration is stopped when $y_t^{(n)} = y_t^{(n-1)}$, so as to obtain the position $y_t = y_t^{(n)}$ of the column where the human body median line is located.

In a specific embodiment, the stage of obtaining shape feature information in S130 may comprises: obtaining an edge curve of the extracted normalized region sub-image according to the edge detection algorithm, and obtaining the shape feature information based on the curvature of points on the edge curve;

The stage of acquiring gray variance information in stage S130 may comprise:

processing the normalized region sub-image through gray variance calculation to obtain the gray variance information.

In a specific embodiment, the chest region feature information comprises chest region haar-like feature information, and the crotch region feature information comprises crotch region haar-like feature information.

Specifically, the normalized chest sub-image $I_{ch}$ can be subjected to the Canny edge detection algorithm, so as to obtain the normalized chest sub-image edge curve $e_{ch} = [e_1, \ldots, e_i, \ldots, e_n]$, then SVD (Matrix Singular Value Decomposition) is performed on each point $e_i$ of the edge curve to estimate its tangent direction, the ratio of the change amount of the tangent direction of a neighboring point to the Euclidean distance therebetween can be approximately considered as the curvature of the point, and the shape feature information $E_{ch}$ of the chest sub-image is further obtained;

the haar-like feature information $F_{ch}$ of the normalized chest sub-image $I_{ch}$ and the haar-like feature information $F_{cr}$ of the crotch sub-image $I_{cr}$ are extracted respectively, and the gray variance $T_{cr}$ of the normalized crotch sub-image $I_{cr}$ is calculated.

In a specific embodiment, S160 may comprise:

classifying the millimeter wave grayscale image to obtain the classification recognition result according to the output results and the weight of each classifier.

Specifically, for the classifiers trained in the above stages, a weight is set for each classifier according to classifier accuracy, and the current image to be recognized is classified under the category to which the recognition results of the multiple classifiers are closer.

Figure 2:
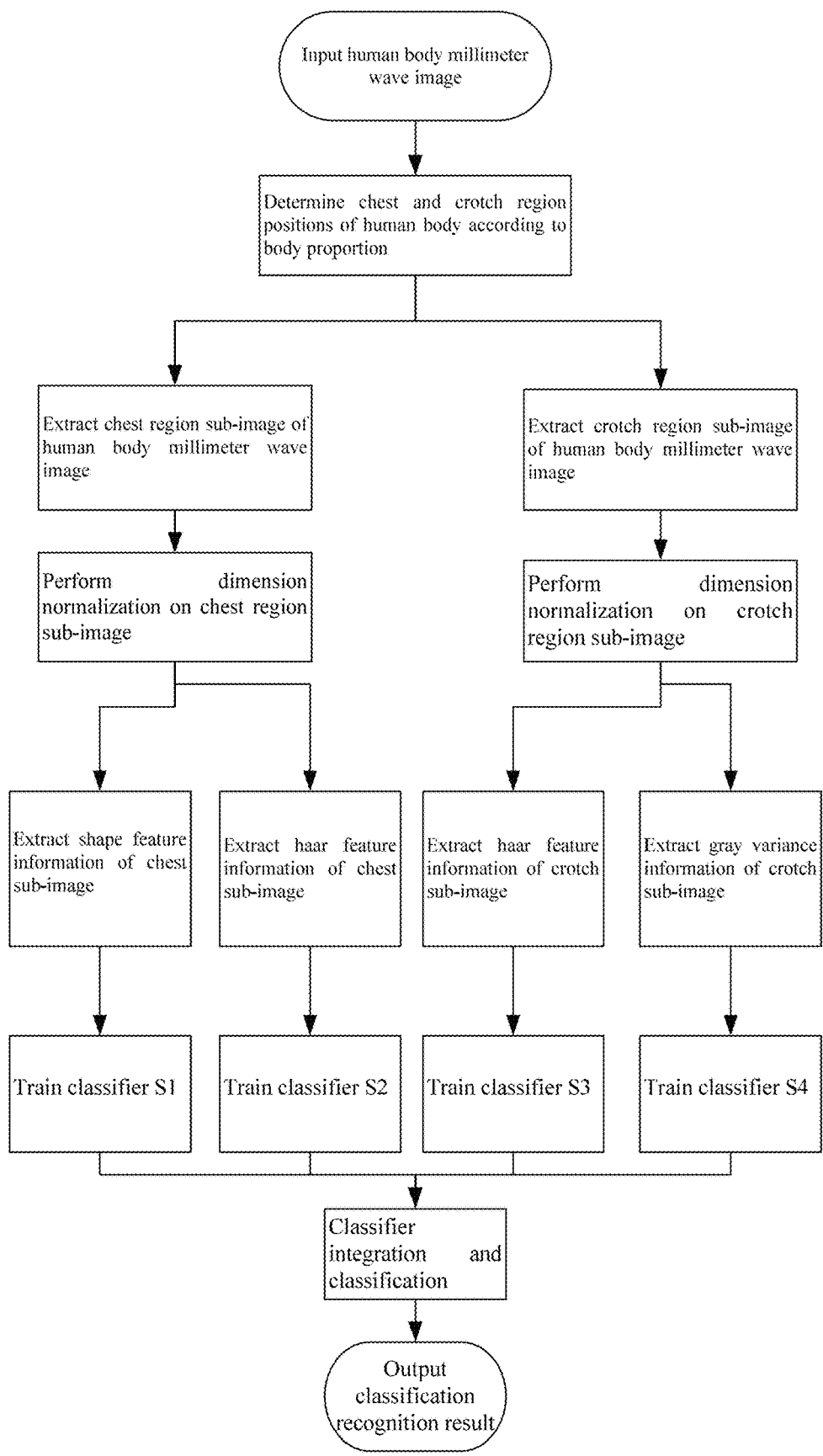
FIG. 2 is a flowchart of an embodiment of a human body gender automatic recognition method.
Figure 3:
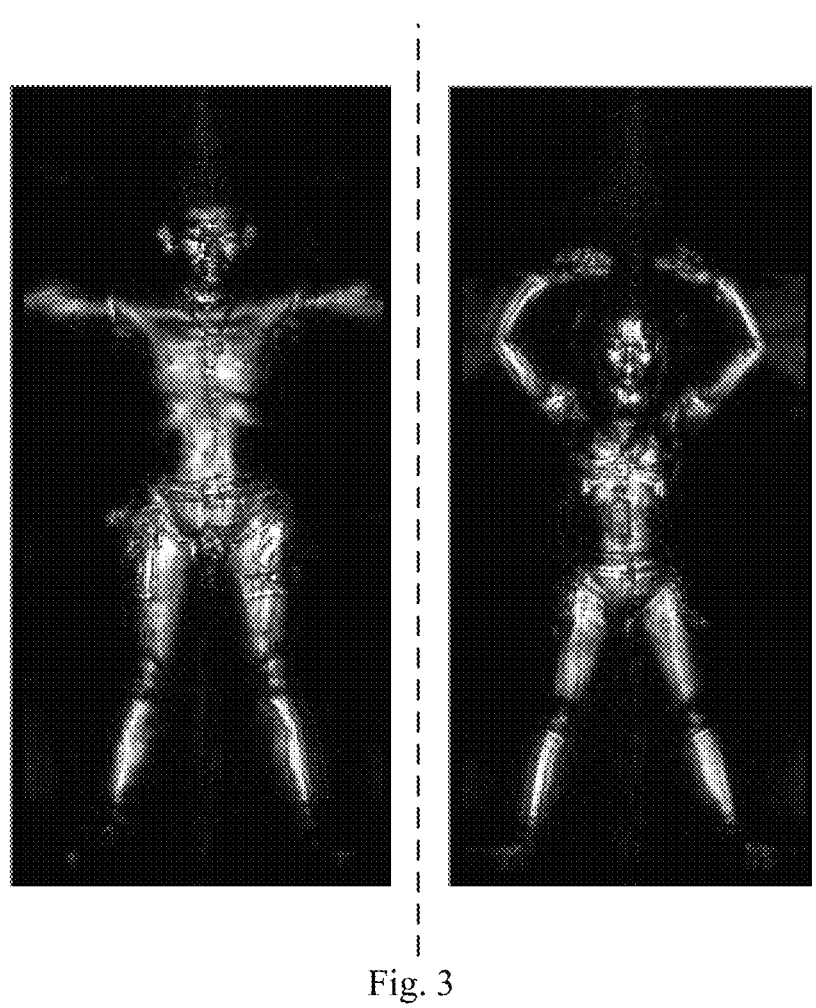
FIG. 3 is an example diagram of male and female input images according to an embodiment human body gender automatic recognition method.

Embodiment 2 of Human Body Gender Automatic Recognition Method of the Present Disclosure In order to solve the problem of low calculation efficiency and recognition accuracy of the traditional gender recognition methods, the disclosure further provides embodiment 2 of a human body gender automatic recognition method. FIG. 2 is a flowchart of embodiment 2 of the human body gender automatic recognition method of the present disclosure. As shown in FIG. 2, the following stages may be included:

(a) inputting a millimeter wave grayscale image I containing a millimeter wave detection result of a human body; FIG. 3 is an example diagram of male (left) and female (right) input images according to a human body gender automatic recognition method of the present disclosure;

(b) determining chest and crotch region positions in the millimeter wave grayscale image I according to the body proportion derived from statistical data;

stage (b) may comprise the following sub-stages:

(b1) obtaining the binarized image $I_b$ according to the segmentation threshold T: the pixel area with a gray value higher than T in the millimeter wave grayscale image I is regarded as the human body area, the gray value is set to be 255, and the rest is regarded as the background area and set to be 0:

$$I_b(x, y) = \begin{cases} 255 & I(x, y) \ge T \\ 0 & I(x, y) < T \end{cases}, 1 \le x \le X, 1 \le y \le Y$$

the number of rows and the number of columns of the matrix $I_b$ are equal to the number of rows and the number of columns of the millimeter wave grayscale image I respectively, and X and Y are the number of rows and the number of columns of I respectively, wherein the image is binarized so that the target is white (the grayscale appears as 255) and the background is black (the grayscale appears as 0);

(b2) constructing a spatial distribution histogram vector $H_y$ for the human body region segmented in $I_b$ (x,y) in the y direction:

$$H_y(y) = \sum_x \delta(I_b(x, y) = 255)$$

wherein δ represents the Dirac δ function; x represents row coordinates;

and y represents column coordinates;

(b3) smoothing the histogram vector $H_y$ with a smoothing scale of 3 (smoothing scale is the size of a smoothing window);

$$H_y(y) = \begin{cases} H_y(y) & y < 2 \\ (H_y(y-1) + H_y(y) + H_y(y+1))/3 & 2 \le y \le Y-1 \\ H_y(y) & y > Y-1 \end{cases}$$

(b4) obtaining the column where the vertical median line of the human body is located through iterative operation of the histogram vector $H_y$ in the y direction;

(b5) counting the left and right pixels of the column where the median line of the binary image $I_b$ is located from bottom to top with the middle row of the column obtained in stage (b4) where the vertical median line of the human body is located as the benchmark, and marking the row as the row $x_t$ where the head of the human body is located if the number of pixels with a gray value of 255 is less than the set threshold Tt;

(b6) counting the pixels of the binary image $I_b$ from top to bottom according to the set search range $x \in [X-T_F, X]$, $y \in [0,Y]$, wherein $T_F$ is an empirically set range of distance between a foot row and the number of rows of the image, and marking the row as the row $x_f$ where the foot of the human body is located if the number of pixels with a gray value of 255 is less than the set threshold $T_f$; and (b7) determining the height $H_e = x_f - x_t$ of the human body according to the row where the head is located and the row where the foot is located determined in (b5) and (b6), and further calculating the chest starting row as $x_{ch} = x_f - H_e * R_{ch}$ and the crotch starting row as $x_{cr} = x_f - H_e * R_{cr}$ according to the body proportion, wherein $R_{ch}$ is the ratio of chest to body height in a statistical sense and $R_{cr}$ is the ratio of crotch to body height in a statistical sense;

stage (b4) may comprise the following sub-stages:

(b4-1) setting the initial center point position value $y_t^{(0)}$ in the y-direction spatial distribution histogram vector $H_y$;

$$y_t^{(0)} = (\min(y) + \max(y))/2;$$

(b4-2) calculating the spatial distribution mean values $\mu_{y1}^{(n)}$ and $\mu_{y2}^{(n)}$ of the set $Y_1$ whose spatial distribution position is lower than $y_t^{(n-1)}$ and the set $Y_2$ whose spatial distribution position is higher than $y_t^{(n-1)}$ respectively:

$$\mu_{Y1}^{(n)} = \frac{\sum_{y<y_t^{(n-1)}} yH_y(y)}{\sum_{y<y_t^{(n-1)}} H_y(y)}, \mu_{Y2}^{(n)} = \frac{\sum_{y<y_t^{(n-1)}} yH_y(y)}{\sum_{y<y_t^{(n-1)}} H_y(y)};$$

Figure 4:
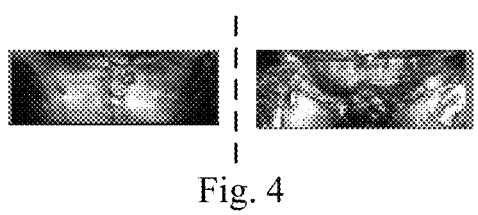
FIG. 4 is an example diagram of images obtained after extracting male chest and crotch region sub-images and performing dimension normalization according to an embodiment human body gender automatic recognition method.
Figure 5:
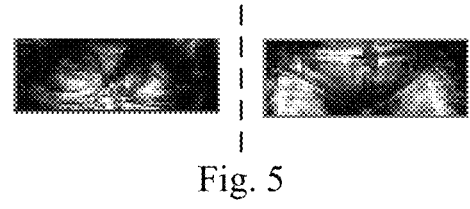
FIG. 5 is an example diagram of images obtained after extracting female chest and crotch region sub-images and performing dimension normalization according to an embodiment human body gender automatic recognition method.

(b4-3) based on $y_t^{(n)} = (\mu_{Y1}^{(n)} - \mu_{Y2}^{(n)})/2$, stopping iteration when $y_t^{(n)} = y_t^{(n-1)}$, at which time $y_t = y_t^{(n)}$ is the position of the human body median line, otherwise returning to (b4-2) to continue the iteration;

(c) extracting chest and crotch region sub-images $I_{ch}$ and $I_{cr}$ of the millimeter wave grayscale image I;

stage (c) may comprise the following sub-stages:

(c1) setting the chest search range $x \in [x_{ch}, H_e * R_{ch}]$, $y \in [y_t - H_e * W_{ch}, y_t + H_e * W_{ch}]$, and extracting a chest region image to obtain the chest region sub-image $I_{ch}$, wherein $W_{ch}$ is the ratio of chest width to body height in statistical sense; and (c2) setting the crotch search range $x \in [x_{cr}, H_e * R_{cr}]$, $y \in [y_t - H_e * W_{cr}, y_t + H_e * W_{cr}]$, and extracting a crotch region image to obtain the crotch region sub-image $I_{cr}$, wherein $W_{cr}$ is the ratio of crotch width to body height in statistical sense;

(d) performing dimension normalization on the chest region sub-image $I_{ch}$ and the crotch region sub-image $I_{cr}$ to obtain the normalized chest sub-image $I_{ch}'$ and the normalized crotch sub-image $I_{cr}'$;

stage (d) may comprise the following sub-stages:

(d1) mapping the chest sub-image $I_{ch}$ to an independent space with the size $x_{ch} * Y_{ch}$ to obtain a new chest sub-image $I_{ch}'$; and (d2) mapping the crotch sub-image $I_{cr}$ to an independent space with the size $x_{cr} * Y_{cr}$ to obtain a new crotch sub-image $I_{cr}'$;

FIG. 4 is an example diagram of images obtained after extracting male chest and crotch region sub-images and performing dimension normalization according to the human body gender automatic recognition method of the present disclosure; and FIG. 5 is an example diagram of images obtained after extracting female chest and crotch region sub-images and performing dimension normalization according to the human body gender automatic recognition method of the present disclosure;

(e) extracting shape feature information and haar-like feature information of the normalized chest sub-image $I_{ch}'$ and gray variance information and haar-like feature information of the normalized crotch sub-image $I_{cr}'$;

stage (e) may comprise the following sub-stages:

(e1) applying the Canny edge detection algorithm to the normalized chest sub-image $I_{ch}'$, so as to obtain the normalized chest sub-image edge curve $e_{ch} = [e_1, \ldots, e_i, \ldots, e_n]$, then performing SVD (Matrix Singular Value Decomposition) on each point $e_i$ of the edge curve to estimate its tangent direction, approximately considering the ratio of the change amount of the tangent direction of a neighboring point to the Euclidean distance therebetween as the curvature of the point, and further obtaining the shape feature information $E_{ch}$ of the chest sub-image;

(e2) extracting the haar-like feature information $F_{ch}$ and $F_{cr}$ of the normalized chest sub-image $I_{ch}'$ and crotch sub-image $I_{cr}'$ respectively; and (e3) calculating the gray variance $T_{cr}$ of the normalized crotch sub-image $I_{cr}'$;

(f) training classifier S1 for the shape feature information extracted from the normalized chest sub-image $I_{ch}'$, training classifier S2 for the haar-like feature information extracted from the normalized chest sub-image $I_{ch}'$, training classifier S3 for the haar-like feature information extracted from the normalized crotch sub-image $I_{cr}'$, and training classifier S4 for the gray variance information extracted from the normalized crotch sub-image $I_{cr}'$;

stage (f) may comprise the following sub-stages:

(f1) randomly selecting N frames of male images and N frames of female images in a millimeter wave image library as training samples, wherein N is an integer smaller than the smaller one of the number of male images and the number of female images in the sample library;

(f2) extracting the shape feature information of the chest sub-images, the haar-like feature information of the chest sub-images and the crotch sub-images, and the variance information of the crotch sub-images of the N frames of male images and N frames of female images according to stages (b)-(e);

(f3) training classifier S1 for the shape feature information of the chest sub-images of the N frames of male images and N frames of female images, and sorting the N distances between the shape feature information of the image to be recognized and the shape feature information of the N frames of male images and N frames of female images from small to large, wherein the current image to be recognized belongs to the same category as the image nearest to it;

(f4) training classifier S2 and classifier S3 for the haar-like feature information of the chest sub-images and the crotch sub-images of the N frames of male images and N frames of female images respectively, and sorting the N distances between the haar-like feature information of the chest sub-image and the crotch sub-image of the image to be recognized and the haar-like feature information of the chest sub-images and the crotch sub-images of the N frames of male images and N frames of female images from small to large, wherein the current image to be recognized belongs to the same category as the image nearest to it; and (f5) training classifier S4 for the gray variance information of the crotch sub-images of the N frames of male images and N frames of female images, and sorting the N distances between the gray variance information of the image to be recognized and the gray variance information of the N frames of male images and N frames of female images from small to large, wherein the current image to be recognized belongs to the same category as the image nearest to it;

and stage (g) comprises the following sub-stages:

for the classifiers S1, S2, S3 and S4 trained in stage (f), setting a weight for each classifier according to classifier accuracy, and classifying the current image to be recognized under the category to which the recognition results of the multiple classifiers are closer, wherein the gray segmentation threshold algorithm involved in stage (b1) is an automatic threshold segmentation algorithm.

Compared with the traditional human body gender automatic recognition methods, the present disclosure has the following outstanding advantages:

(1) based on the fact that the chest and crotch region sub-images in millimeter wave images of human bodies of different genders show discriminative features, different feature extraction methods are adopted instead of simply relying on gray variance for recognition, so as to effectively improve recognition accuracy and also ensure the real-time property; and (2) through integration of the multiple classifiers, the situation where a certain misjudgment rate exists for the classification recognition result of a single classifier is avoided.

Figure 6:
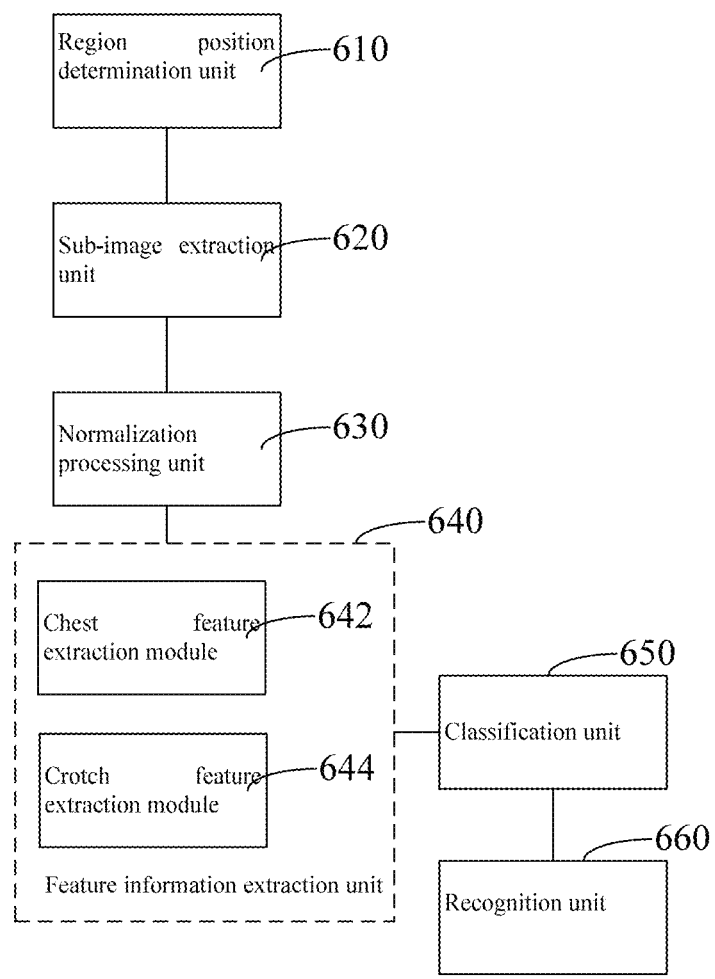
FIG. 6 is a structural diagram of an embodiment of a human body gender automatic recognition apparatus.

Embodiment 1 of Human Body Gender Automatic Recognition Apparatus of the Present Disclosure Based on the technical idea of the human body gender automatic recognition method described above and in order to solve the problem of low calculation efficiency and recognition accuracy of the traditional gender recognition methods, the present disclosure further provides embodiment 1 of a human body gender automatic recognition apparatus. FIG. 6 is a structural diagram of embodiment 1 of a human body gender automatic recognition apparatus of the present disclosure. As shown in FIG. 6, the apparatus may comprise:

a region position determination unit 610, used for acquiring a current millimeter wave grayscale image to be recognized, and determining gender part region positions of a human body in the millimeter wave grayscale image according to a pre-set body proportion, wherein the gender part region positions include a chest region position and a crotch region position;

a sub-image extraction unit 620, used for extracting a region sub-image corresponding to the gender part region position;

a normalization processing unit 630, used for performing dimension normalization on the region sub-image to obtain a normalized region sub-image;

a feature information extraction unit 640, used for performing feature information extraction on the normalized region sub-image to obtain feature information about the normalized region sub-image, wherein the feature information includes shape feature information and chest region feature information of the chest region position, and gray variance information and crotch region feature information of the crotch region position;

a classification unit 650, used for recognizing the millimeter wave grayscale image by means of each pre-set classifier based on corresponding feature information, and respectively outputting results, wherein the classifier is trained based on the feature information corresponding to the training samples in the millimeter wave image database; and a recognition unit 660, used for integrating the output results to obtain a classification recognition result of the millimeter wave grayscale image.

In a specific embodiment, the feature information extraction unit 640 comprises:

a chest feature extraction module 642, used for extracting chest region feature information, obtaining an edge curve of the extracted normalized region sub-image according to the edge detection algorithm, and obtaining the shape feature information based on the curvature of points on the edge curve; and a crotch feature extraction module 644, used for extracting crotch region feature information and performing gray variance calculation processing on the normalized region sub-image to obtain gray variance information.

In a specific embodiment, the chest region feature information comprises chest region haar-like feature information, and the crotch region feature information comprises crotch region haar-like feature information.

In a specific embodiment, the recognition unit 660 is used for classifying the millimeter wave grayscale image to obtain the classification recognition result according to the output results and the weight of each classifier.

According to embodiment 1 of the human body gender automatic recognition apparatus, in order to achieve high recognition accuracy during automatic recognition of the gender of a human body in a millimeter wave image, content information of the millimeter wave image is analyzed according to different characteristics of imaging results of the millimeter wave images of human bodies of different genders, and gender recognition is achieved by extracting different kinds of feature information and integrating multiple classifiers, so that human body gender automatic recognition is realized by means of the millimeter wave image. The present disclosure can be effectively applied to a real millimeter wave security inspection system, has high recognition rate and calculation efficiency, and solves the problem of adopting different privacy protection and detection methods for human bodies of different genders in the millimeter wave security inspection system.

The technical features of the above-described embodiments can be combined freely, and all possible combinations of the technical features in the above-described embodiments are not described for simplicity of description. However, as long as there is no contradiction between the combinations of these technical features, they should be considered within the scope of this specification.

The above-mentioned embodiments only describe several implementations of the present disclosure in a specific and detailed way, but it is not to be understood as limiting the scope of the disclosure. It should be noted that it is within the scope of the present disclosure for a person of ordinary skill in the art to make several modifications and improvements without departing from the concept of the present disclosure. Therefore, the scope of protection of the patent for the disclosure shall be subject to the appended claims.

What is claimed is:

1. A human body gender automatic recognition method, comprising:
    acquiring a current millimeter wave grayscale image to be recognized, and determining gender part region positions of a human body in the millimeter wave grayscale image according to a pre-set body proportion, wherein the gender part region positions include a chest region position and a crotch region position;
    extracting a region sub-image corresponding to the gender part region position;
    performing dimension normalization on the region sub-image to obtain a normalized region sub-image;
    performing feature information extraction on the normalized region sub-image to obtain feature information about the normalized region sub-image, wherein the feature information includes shape feature information and chest region feature information of the chest region position, and gray variance information and crotch region feature information of the crotch region position;
    recognizing the millimeter wave grayscale image by means of each pre-set classifier corresponding to the feature information according to a size order of feature distances, and respectively generating output results, wherein a feature distance is a distance between the feature information and feature information of a corresponding pre-set classifier; and
    integrating the output results to obtain a classification recognition result of the millimeter wave grayscale image.

2. The method according to claim 1, wherein determining gender part region positions of the human body in the millimeter wave grayscale image according to the pre-set body proportion comprises:
    obtaining a binary image $I_b$ of the millimeter wave grayscale image based on the following formula according to a segmentation threshold T:

$$I_b(x, y) = \begin{cases} 255 & I(x, y) \geq T \\ 0 & I(x, y) < T \end{cases}, 1 \leq x \leq X, 1 \leq y \leq Y$$

X is the number of rows of the millimeter wave grayscale image; and
Y is the number of columns of the millimeter wave grayscale image;
based on the following formula, constructing the spatial distribution histogram vector $H_y$ for a human body region segmented in $I_b$ (x,y) in the y direction:

$$H_y(y) = \sum_x \delta(I_b(x, y) = 255)$$

wherein $\delta$ represents the Dirac $\delta$ function; x represents row coordinates; and y represents column coordinates;
smoothing the histogram vector $H_y$ based on the following formula:

$$H_y(y) = \begin{cases} H_y(y) & y < 2 \\ (H_y(y-1) + H_y(y) + H_y(y+1))/3 & 2 \leq y \leq Y-1 \\ H_y(y) & y > Y-1 \end{cases}$$

obtaining a column where a vertical median line of the human body is located through iterative operation of the histogram vector $H_y$ in the y direction;
counting left and right pixels of the column where a median line of the binary image $I_b$ is located with a middle row of the column where the vertical median line of the human body is located as the benchmark, so as to obtain the row $x_t$ where the head of the human body is located and the row $x_f$ where the foot of the human body is located;
determining a height $H_e = x_t - x_f$ of the human body according to the row $x_t$ where the head of the human body is located and the row $X_f$ where the foot of the human body is located; and
according to the preset body proportion, based on the following formula calculating a chest starting row $x_{ch} = x_f - H_e * R_{ch}$ and a crotch starting row $x_{cr} = x_f - H_e * R_{cr}$, wherein $R_{ch}$ is the ratio of chest to body height in statistical sense and $R_{cr}$ is the ratio of crotch to body height in statistical sense.

3. The method according to claim 2, wherein obtaining the column where the vertical median line of the human body is located through iterative operation of the histogram vector $H_y$ in the y direction, comprises:
    setting an initial center point position value $y_t^{(0)}$ in the y-direction spatial distribution histogram vector $H_y$ based on the following formula:

$$y_t^{(0)} = (\min(y) + \max(y))/2;$$

based on the following formula, calculating the spatial distribution mean values $\mu_{y1}^{(n)}$ and $\mu_{y2}^{(n)}$ of a set $Y_1$ whose spatial distribution position is lower than $y_t^{(n-1)}$ and a set $Y_2$ whose spatial distribution position is higher than $y_t^{(n-1)}$ respectively:

$$\mu_{Y_1}^{(n)} = \frac{\sum_{y<y_t^{(n-1)}} yH_y(y)}{\sum_{y<y_t^{(n-1)}} H_y(y)}, \mu_{Y_2}^{(n)} = \frac{\sum_{y<y_t^{(n-1)}} yH_y(y)}{\sum_{y<y_t^{(n-1)}} H_y(y)};$$

based on $y_t^{(n)}=(\mu_{Y_1}^{(n)}-\mu_{Y_2}^{(n)})/2$, stopping iteration when $y_t^{(n)}=y_t^{(n-1)}$, so as to obtain the position $y_t=y_t^{(n)}$ of the column where the human body median line is located.

4. The method according to claim 3, wherein performing feature information extraction, to obtain feature information that includes shape feature information and gray variance information, comprises:
preforming an edge detection algorithm to determine an edge curve of the extracted normalized region sub-image, and determining the shape feature information based on a curvature of points on the edge curve; and
performing a gray variance calculation on the normalized region sub-image to determine the gray variance information.

5. The method according to claim 3, wherein:
the chest region feature information includes chest region haar-like feature information, and
the crotch region feature information includes crotch region haar-like feature information.

6. The method according to claim 3, wherein integrating the output results to obtain the classification recognition result of the millimeter wave grayscale image comprises:
classifying the millimeter wave grayscale image to obtain the classification recognition result according to the output results and a weight of each classifier.

7. The method according to claim 2, wherein performing feature information extraction, to obtain feature information that includes shape feature information and gray variance information, comprises:
preforming an edge detection algorithm to determine an edge curve of the extracted normalized region sub-image, and determining the shape feature information based on a curvature of points on the edge curve; and
performing a gray variance calculation on the normalized region sub-image to determine the gray variance information.

8. The method according to claim 2, wherein:
the chest region feature information includes chest region haar-like feature information, and
the crotch region feature information includes crotch region haar-like feature information.

9. The method according to claim 2, wherein integrating the output results to obtain the classification recognition result of the millimeter wave grayscale image comprises:
classifying the millimeter wave grayscale image to obtain the classification recognition result according to the output results and a weight of each classifier.

10. The method according to claim 1, wherein performing feature information extraction to obtain feature information including shape feature information and gray variance information, comprises:
determining an edge curve of the extracted normalized region sub-image according to an edge detection algorithm, and determining the shape feature information based on the curvature of points on the edge curve; and
performing a gray variance calculation on the normalized region sub-image to generate the gray variance information.

11. The method according to claim 1, wherein the chest region feature information includes chest region haar-like feature information, and the crotch region feature information includes crotch region haar-like feature information.

12. The method according to claim 1, wherein integrating the output results to obtain the classification recognition result of the millimeter wave grayscale image comprises:
classifying the millimeter wave grayscale image to obtain the classification recognition result according to the output results and a weight of each classifier.

13. A human body gender automatic recognition apparatus, comprising:
a region position determination circuit configured:
to acquire a current millimeter wave grayscale image to be recognized, and
to determine gender part region positions of a human body in the millimeter wave grayscale image according to a pre-set body proportion, wherein the gender part region positions include a chest region position and a crotch region position;
a sub-image extraction circuit configured to extract a region sub-image corresponding to the gender part region position;
a normalization processing circuit configured to perform dimension normalization on the region sub-image to obtain a normalized region sub-image;
a feature information extraction circuit configured to perform feature information extraction on the normalized region sub-image to obtain feature information about the normalized region sub-image, wherein the feature information includes shape feature information and chest region feature information of the chest region position, and gray variance information and crotch region feature information of the crotch region position;
a classification circuit configured to recognize the millimeter wave grayscale image by means of each pre-set classifier corresponding to the feature information according to a size order of feature distances, and respectively generating output results, wherein the feature distance is the distance between the feature information and the feature information of the corresponding pre-set classifier; and
a recognition circuit configured to integrate the output results to obtain a classification recognition result of the millimeter wave grayscale image.

14. The apparatus according to claim 13, wherein the feature information extraction circuit comprises:
a chest feature extraction circuit configured:
to extract the chest region feature information by obtaining an edge curve of the extracted normalized region sub-image according to an edge detection algorithm, and
to obtain the chest feature information based on a curvature of points on the edge curve; and
a crotch feature extraction circuit configured:
to extract the crotch region feature information, and
to perform a gray variance calculation on the normalized region sub-image to obtain the gray variance information.

15. The apparatus according to claim 14, wherein:
the chest region feature information includes chest region haar-like feature information, and
the crotch region feature information includes crotch region haar-like feature information.

16. The apparatus according to claim 14, wherein the recognition circuit is configured to classify the millimeter wave grayscale image to obtain the classification recognition result according to the output results and a weight of each classifier.

17. The apparatus according to claim 13, wherein the chest region feature information includes chest region haar-like feature information, and the crotch region feature information includes crotch region haar-like feature information.

18. The apparatus according to claim 13, wherein the recognition circuit is configured to classify the millimeter wave grayscale image to obtain the classification recognition result according to the output results and a weight of each classifier.

* * * * *